US008620355B2

(12) United States Patent
Yeo et al.

(10) Patent No.: US 8,620,355 B2
(45) Date of Patent: Dec. 31, 2013

(54) METHOD AND APPARATUS FOR DETERMINING THE POSITION OF A WIRELESS TERMINAL BASED ON PROPAGATION DELAY TAPS OF BASE STATIONS

(75) Inventors: Geon Min Yeo, Daejeon-si (KR); Young Il Kim, Daejeon-si (KR); Won Ryu, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/572,173

(22) Filed: Aug. 10, 2012
(Under 37 CFR 1.47)

(65) Prior Publication Data

US 2013/0267258 A1    Oct. 10, 2013

(30) Foreign Application Priority Data

Apr. 4, 2012 (KR) .......................... 10-2012-0034748

(51) Int. Cl.
*H04W 24/00* (2009.01)

(52) U.S. Cl.
USPC ..................... 455/456.5; 455/404.2; 455/420; 455/437; 455/436; 455/456.6; 370/324; 370/350; 370/331; 370/338; 370/332

(58) Field of Classification Search
USPC ............ 455/456.1–456.6, 454, 404.2, 414.2, 455/440, 67.1, 457, 410, 186.1, 506, 67.16, 455/422.1, 420, 41.2, 500, 502, 522; 370/310.2, 324, 350, 328, 338, 331, 370/332
See application file for complete search history.

(56) References Cited

U.S. PATENT DOCUMENTS

| 2007/0014252 | A1 | 1/2007 | Chung et al. | |
| 2010/0159842 | A1* | 6/2010 | Fukagawa et al. | 455/67.11 |
| 2011/0074632 | A1* | 3/2011 | Yeo et al. | 342/387 |

FOREIGN PATENT DOCUMENTS

KR    1020100001126 A    1/2010

* cited by examiner

*Primary Examiner* — Vladimir Magloire
*Assistant Examiner* — Babar Sarwar
(74) *Attorney, Agent, or Firm* — Ladas & Parry LLP (57) ABSTRACT

A method for wireless positioning is provided. The method for wireless positioning includes: acquiring synchronization with base stations; collecting a plurality of propagation delay taps for the base stations; determining a final propagation delay tap among the plurality of propagation delay taps; calculating a time difference of arrival (TDOA) value using the final propagation delay value; and deriving locations of the terminals using the calculated TDOA value. By this configuration, the positioning accuracy can be improved.

20 Claims, 7 Drawing Sheets

METHOD AND APPARATUS FOR DETERMINING THE POSITION OF A WIRELESS TERMINAL BASED ON PROPAGATION DELAY TAPS OF BASE STATIONS

CROSS-REFERENCE TO RELATED APPLICATIONS

This application claims the benefit of priority of Korean Patent Application No. 10-2012-0034748 filed on Apr. 4, 2012, which is incorporated by reference in their entirety herein.

BACKGROUND OF THE INVENTION

1. Field of the Invention

The present invention relates to wireless communications, and more particularly, to a method and an apparatus for wireless positioning.

2. Related Art

Wireless positioning is a technology of acquiring information regarding locations, speed, or features of other things using wireless communications. Recently, as a demand for a location based service (LBS) is increased, applications of the wireless positioning technology have been expanded. In particular, as a demand for technologies capable of providing appropriate services to users by detecting situations or locations of users is increased, an interest in the wireless positioning technology has been increased. An example of a wireless positioning scheme may include a global positioning system (GPS), a wireless LAN based positioning scheme, a mobile communication network based positioning scheme, and the like.

Meanwhile, a multicast and broadcast service (MBS) technology is a technology of supporting multicast transmission in a wireless communication network. The MBS enables multiple users to simultaneously receive the same data by performing wireless transmission only once, which is considered as a core technology of a next-generation communication system.

SUMMARY OF THE INVENTION

The present invention provides a method and an apparatus for wireless positioning capable of improving positioning accuracy.

In an aspect, a method for wireless positioning measuring locations of terminals is provided. The method for wireless positioning measuring locations of terminals includes: acquiring synchronization with base stations; collecting a plurality of propagation delay taps for the base stations; determining a final propagation delay tap among the plurality of propagation delay taps; calculating a time difference of arrival (TDOA) value using the final propagation delay tap; and deriving locations of the terminals using the calculated TDOA value, wherein the plurality of propagation delay taps include a first valid propagation tap, a maximum signal intensity tap, and an intermediate valid propagation tap, the first valid propagation tap is a first received propagation delay tap among the valid propagation delay taps having signal intensity of valid propagation threshold or more, the maximum signal intensity tap is a propagation delay tap having maximum signal intensity among the valid propagation delay taps, and the intermediate valid propagation taps is a propagation delay tap received between receiving timing of the first valid propagation tap and receiving timing of the maximum signal intensity tap, among the valid propagation delay taps.

When current communication environment is a multicast and broadcast service (MBS) macro-diversity mode, the base station may be an MBS base station, and the acquiring of the synchronization may include: determining whether to acquire synchronization with the base stations; and if it is determined that the synchronization with the base stations is not acquired, performing synchronization with the base stations.

When current communication environment is not a multicast and broadcast service (MBS) macro-diversity mode, the acquiring of the synchronization may include: performing synchronization with the base stations.

The valid propagation threshold may be changed according to at least one of the current propagation environment and time.

In the determining of the final propagation delay tap, the first valid propagation tap may be determined as the final propagation delay tap.

In the determining of the final propagation delay tap, the maximum signal intensity tap may be determined as the final propagation delay tap.

In the determining of the final propagation delay tap, the intermediate valid propagation tap may be determined as the final propagation delay tap.

The determining of the final propagation delay tap may include: determining receiving timing of the final propagation delay tap by applying weights at the receiving timing of the first valid propagation tap and at the receiving timing of the maximum signal intensity tap; and determining the final propagation delay tap based on the determined receiving timing.

Receiving timing k of the final propagation delay tap may be determined by the following Equation.

$$k=(1-\text{alpha})*T\_f+\text{alpha}*T\_m$$

where the alpha has values between 0 and 1 as the weights, the $T\_f$ represents the receiving timing of the first valid propagation tap, and the $T\_m$ represents the receiving timing of the maximum signal intensity tap.

In the determining of the final propagation delay tap, the final propagation delay tap may be determined using the signal intensity of the plurality of propagation delay taps, respectively, and the time delay value of the plurality of propagation delay taps, respectively.

In another aspect, an apparatus for wireless positioning measuring locations of terminals is provided. The apparatus for wireless positioning measuring locations of terminals includes: a synchronous acquiring unit acquiring synchronization with base stations; a propagation delay tap collecting unit collecting a plurality of propagation delay taps for the base stations; a final propagation delay tap determining unit determining a final propagation delay tap among the plurality of propagation delay taps; and a position calculating unit calculating a time difference of arrival (TDOA) value using the final propagation delay tap and deriving locations of the terminals using the calculated TDOA value, wherein the plurality of propagation delay taps include a first valid propagation tap, a maximum signal intensity tap, and an intermediate valid propagation tap, the first valid propagation tap is a first received propagation delay tap among the valid propagation delay taps having signal intensity of valid propagation threshold or more, the maximum signal intensity tap is a propagation delay tap having maximum signal intensity among the valid propagation delay taps, and the intermediate valid propagation taps is a propagation delay tap received between receiving timing of the first valid propagation tap and receiving timing of the maximum signal intensity tap, among the valid propagation delay taps.

When current communication environment is a multicast and broadcast service (MBS) macro-diversity mode, the base station may be an MBS base station, and the synchronous acquiring unit may determine whether to acquire synchronization with the base stations and if it is determined that the synchronization with the base stations is not acquired, perform synchronization with the base stations.

The valid propagation threshold may be changed according to at least one of the current propagation environment and time.

The final propagation delay tap determining unit may determine the first valid propagation tap as the final propagation delay tap.

The final propagation delay tap determining unit may determine the maximum signal intensity tap as the final propagation delay tap.

The final propagation delay tap determining unit may determine the intermediate valid propagation tap as the final propagation delay tap.

The final propagation delay tap determining unit may determine receiving timing of the final propagation delay tap by applying weights at the receiving timing of the first valid propagation tap and at the receiving timing of the maximum signal intensity tap; and determine the final propagation delay tap based on the determined receiving timing.

The final propagation delay tap determining unit may determine the final propagation delay tap using the signal intensity of the plurality of propagation delay taps, respectively, and the time delay value of the plurality of propagation delay taps, respectively.

DESCRIPTION OF EXEMPLARY EMBODIMENTS

Hereinafter, exemplary embodiments of the present invention will be described in detail with reference to the accompanying drawings. Further, in describing exemplary embodiments of the present invention, well-known functions or constructions will not be described in detail since they may unnecessarily obscure the understanding of the present invention.

It is to be understood that when any element is referred to as being "connected to" or "coupled to" another element, it may be connected directly to or coupled directly to another element or be connected to or coupled to another element, having the other element intervening therebetween. Further, in the present specification, in the case of describing "including" a specific component, it is to be understood that additional components other than a corresponding component are not excluded, but may be included in exemplary embodiments or the technical scope of the present invention.

Terms used in the specification, 'first', 'second', etc., may be used to describe various components, but the components are not to be construed as being limited to the terms. That is, the terms are used to distinguish one component from another component. Therefore, the first component may be referred to as the second component, and the second component may be referred to as the first component.

In addition, components described in exemplary embodiments of the present invention are independently shown only in order to indicate that they perform different characteristic functions. Therefore, the components that are independently shown do not mean that each of the components may not be implemented as one hardware or software. That is, each of the components is divided for convenience of explanation, a plurality of components may be combined with each other to thereby be operated as one component or one component may be divided into a plurality components to thereby be operated as the plurality of components, which are included in the scope of the present invention as long as it departs from essential characteristics of the present invention.

In addition, some of components may not be indispensable components performing essential functions of the present invention, but be selective components improving only performance thereof. The present invention may also be implemented only by a structure including the indispensible components except for the selective components, and the structure including only the indispensible components is also included in the scope of the present invention.

Figure 1:
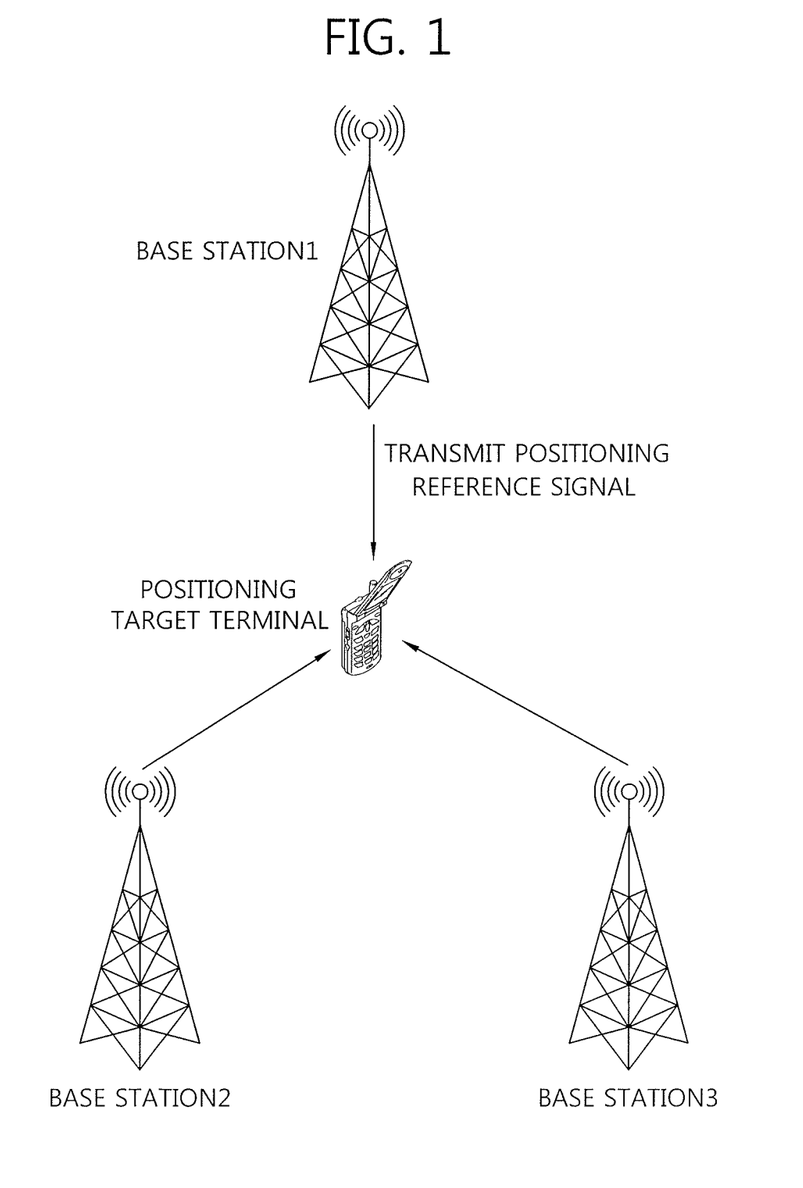
FIG. 1 is a conceptual diagram schematically showing a mobile communication network based positioning scheme according to an exemplary embodiment of the present invention.

FIG. 1 is a conceptual diagram schematically showing a mobile communication network based positioning scheme according to an exemplary embodiment of the present invention.

A representative example of a location based service may include a service using a global positioning system (GPS). The GPS scheme may receive reference satellite signals from a plurality of satellites under the environment in which line of sight (LOS) is good and may use the received reference satellite signals for positioning. Therefore, it is impossible or difficult to perform accurate positioning in areas (GPS shadow areas) in which the line of sight is not good, for example, in areas such as the interior of a room, an underground, buildings, woods, and the like. That is, the GPS scheme may be used in the restrictive environment in which the line of sight is good. Therefore, there is a need to provide non-GPS based positioning so as to perform space seamless positioning that covers the GPS shadow areas.

An example of the non-GPS positioning scheme used for indoor positioning may include a positioning scheme using a wireless LAN. In the wireless LAN based positioning scheme, locations of terminals and/or users may be determined based on whether wireless LAN access points (APs) in which positional information is known in advance are accessed. In addition, the wireless LAN based positioning scheme measures propagation intensity received from the APs to reduce a predicted positioning area, thereby improving the positioning accuracy.

The location based services may be provided to many areas to be positioned by the foregoing GPS based positioning scheme and wireless LAN based positioning scheme. For example, however, when there is no GPS receiver in the positioning terminal, when there is no a wireless LAN receiver in the positioning terminal, and/or when the wireless LAN APs are not installed in the areas to be positioned, there may be conditions in which the GPS based positioning scheme and/or the wireless LAN based positioning scheme may not be used.

In order to provide the seamless positioning under the conditions in which the GPS based positioning scheme or the wireless LAN based positioning scheme may not be used, the existing mobile communication infrastructure that is installed in the entire space may be used. An example of the representative positioning scheme using the mobile communication infrastructure may include a time of arrival (TOA) scheme, a time difference of arrival (TDOA) scheme, an angle of arrival (AOA) scheme, and the like. The positioning scheme represented by triangulation is a positioning scheme that determines the locations of terminals and/or users from a plurality of reference signals.

Referring to FIG. 1, a plurality of synchronized base stations may each transmit the positioning reference signals to positioning target terminals. In this case, the plurality of base stations may simultaneously transmit different positioning reference signals (for example, preamble) to the positioning target terminals. The terminals may recover the positioning reference signals of each base station through a correlator. In addition, the terminals may obtain a received time difference value when the reference signals of each base station reach the terminals. Hereinafter, the received time difference when the reference signals of each base station reach the terminals is referred to as the received time difference. The terminal applies the time difference of arrival (TDOA) scheme using the received time difference value, thereby obtaining the locations of the positioning target terminals.

The foregoing triangulation based positioning scheme has lower positioning accuracy than the GPS and wireless LAN based positioning schemes. This is due to distortion of reference signal propagation represented by non-line-of-sight (NLOS) of propagation. Another problem of the mobile communication based positioning scheme is the propagation distortion under the environment that repeaters are mixed. The foregoing two problems may be a cause of degrading generality of the mobile communication based positioning. The triangulation scheme may provide effective accuracy under the conditions that there are no LOS and repeater and requires the improved positioning scheme so as to solve the above-mentioned problems.

An example of the mobile communication network based positioning scheme may include a positioning scheme using a propagation finger print (FP) in addition the triangulation scheme. Hereinafter, the positioning scheme using the propagation finger print is referred to as the FP scheme. In the FP scheme, information regarding system/network/base station IDs received at the current locations of the terminals and information regarding pilot signals that are the reference signals received from each base station may be data based. In this case, the information of the corresponding positioning time may match the databased information and a point at which the two information is the most similar to each other may be determined as the locations of the terminals and/or users.

The FP scheme may be validly used under the environment that the plurality of repeaters are mixed. In addition, the triangulation scheme requires the plurality of base station signals, but the FP scheme may be effectively used even in the environment that the terminals cannot identify the plurality of base stations, that is, the environment that hearability is low. However, the FP scheme has a problem in that a size of a unit lattice (a minimum space lattice considered as the same environment and position) for identifying locations is not reduced to a sufficient small size. That is, it may be difficult to acquire sufficient resolution in the FP scheme. An example of services currently commercialized using the FP technology may include a pCell scheme of SK Telecom, and the like.

Unlike the FP scheme, the foregoing triangulation based positioning scheme needs not to separately construct database and can perform real-time positioning. The problem of hearability for the triangulation is a very important factor in the mobile communication network based positioning. The hearability is improved and thus, the positioning performance can be improved.

Figure 2:
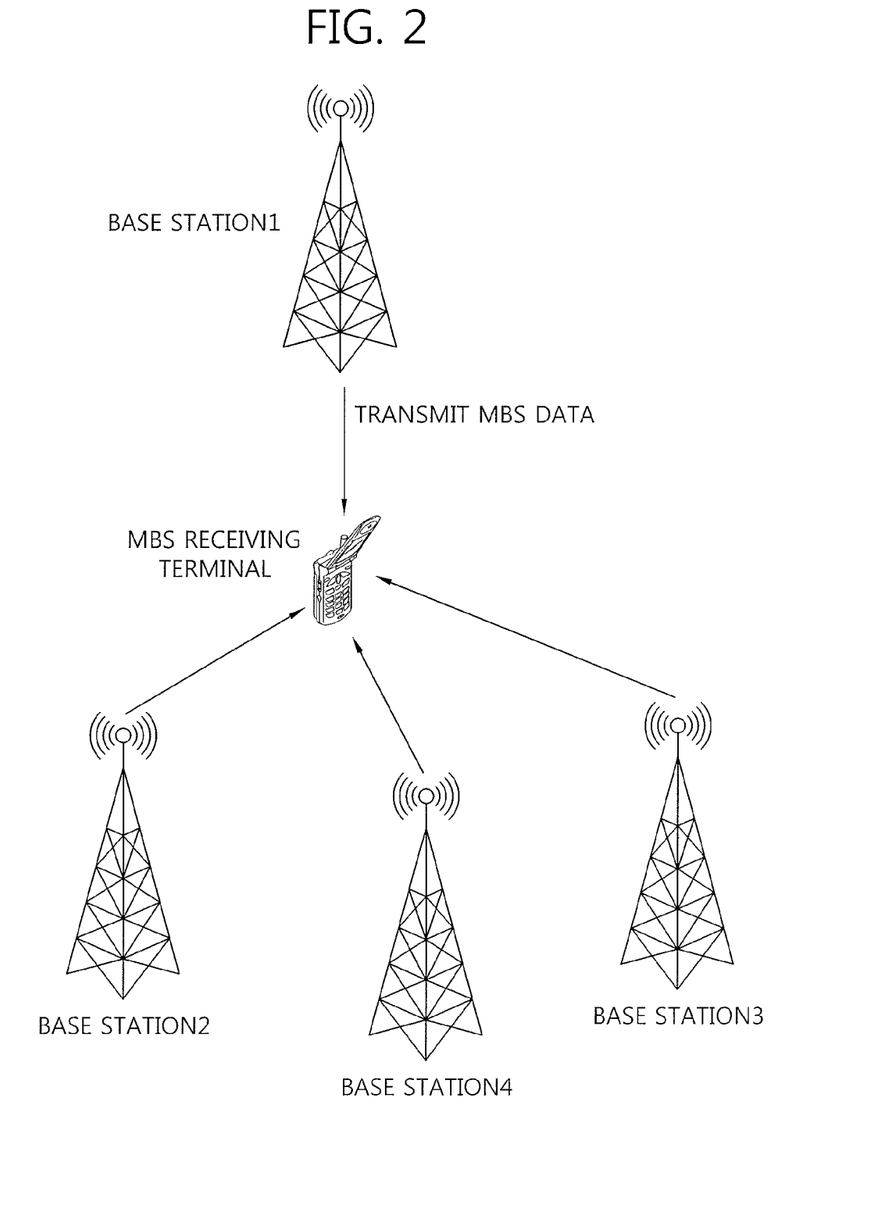
FIG. 2 is a conceptual diagram schematically showing an MBS supporting macro diversity according to an exemplary embodiment of the present invention.

FIG. 2 is a conceptual diagram schematically showing an MBS supporting macro diversity according to an exemplary embodiment of the present invention.

Meanwhile, a multicast and broadcast service (MBS) technology is a technology of supporting multicast transmission in a wireless communication network. The MBS enables multiple users to simultaneously receive the same data by performing wireless transmission only once.

Referring to FIG. 2, the plurality of base stations may be simultaneously synchronized under the MBS environment supporting macro-diversity. The plurality of synchronized base stations transmit the same MBS data to an MBS receiving terminal, thereby maximizing a gain of a receiving side. In this case, the MBS receiving terminal maintains downlink synchronization with each base station and receives and synthesizes the same MBS data from each base station. Hereinafter, the MBS environment supporting the macro-diversity is referred to as an MBS macro-diversity mode.

In the MBS environment, the synchronization between the base stations participating in the MBS needs to be accurate. The features of the MBS are similar to the mobile communication based positioning scheme that simultaneously transmits the plurality of positioning reference signals at the same timing. Therefore, the wireless positioning scheme using the MBS may be provided.

Figure 3:
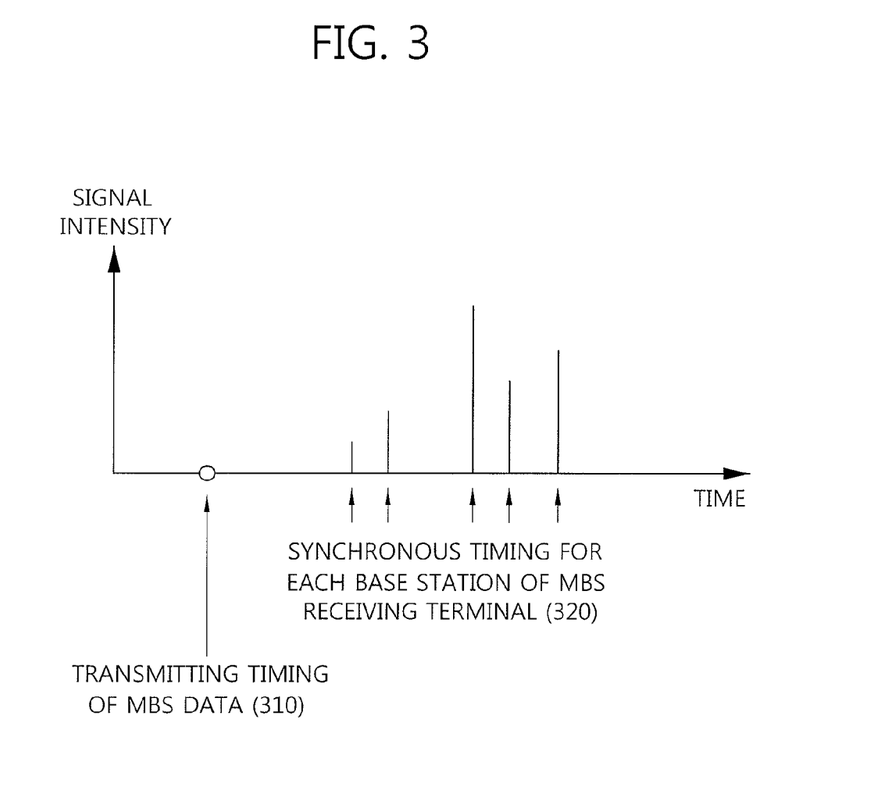
FIG. 3 is a conceptual diagram schematically showing an embodiment of positioning reference signals of each base station in an MBS macro diversity mode.

FIG. 3 is a conceptual diagram schematically showing an embodiment of positioning reference signals of each base station in an MBS macro diversity mode.

Referring to FIG. 3, each base station may transmit the same MBS data to the MBS receiving terminal at the same timing 310. The MBS receiving terminal may perform the downlink synchronization with each base station from synchronization channels of each base station. In this case, reconstructed timing of the MBS data transmitted from the plurality of base stations, respectively, may be different from each other. Synchronization timing 320 of each base station of the MBS receiving terminal may be set as receiving timing of propagation delay taps having maximum signal intensity, among, for example, the plurality of propagation delay taps. Here, the propagation delay taps may occur due to multi-paths of the synchronization channels and may be obtained by the correlator. Hereinafter, the delay taps and the propagation taps have the same meaning as the propagation delay taps.

When the synchronization timing is arrived, the difference in the synchronization timing 320 of each base station of the MBS receiving terminal may be used for calculation of the TDOA value and the locations of the terminals may be calculated by the calculation of the TDOA value. That is, the terminals may use the received time difference value of the positioning reference signals transmitted from each synchronized base station for calculating the locations of the terminals.

Figure 4:
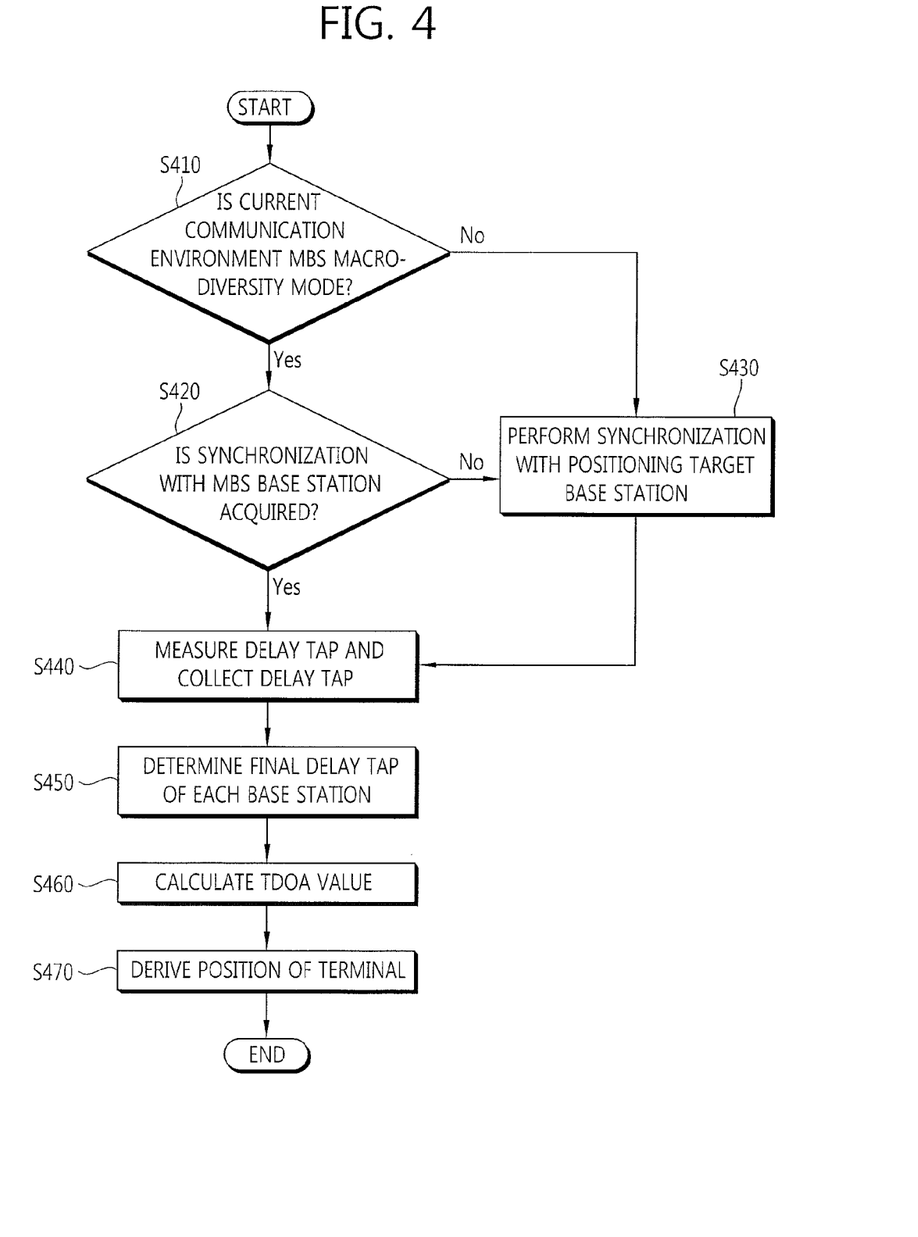
FIG. 4 is a flow chart schematically showing a wireless positioning method according to an exemplary embodiment of the present invention.

FIG. 4 is a flow chart schematically showing a wireless positioning method according to an exemplary embodiment of the present invention.

Referring to FIG. 4, the terminals may determine whether the current communication environment and/or propagation environment is the MBS macro-diversity mode (S410).

When the current communication environment is not the MBS macro-diversity mode, the terminals perform the synchronization with the positioning target base stations to acquire the synchronization with each base station (S430). The wireless positioning method of FIG. 4 may be applied to the MBS macro diversity environment, but may also be applied to other communication environments rather than to the MBS environment.

When the current communication environment is the MBS macro-diversity mode, the terminals may determine whether to acquire the synchronization with the MBS base stations (S420). When the synchronization is not acquired, the terminals perform the synchronization with the positioning target base stations, that is, the MBS base stations to acquire the synchronization with each base station (S430).

When the synchronization with each base station is acquired, the terminals measure the propagation delay taps and may collect or acquire the propagation delay taps for each base station (S440). The terminal may determine the final propagation delay taps for each base station from the acquired propagation delay taps (S450). An embodiment of a method for determining the final propagation delay taps will be described below.

The terminals use the determined final propagation delay taps to calculate the TDOA value (S460). When the TDOA value is calculated, the terminals use the calculated TDOA value to finally derive the locations of the terminals (S470).

Figure 5:
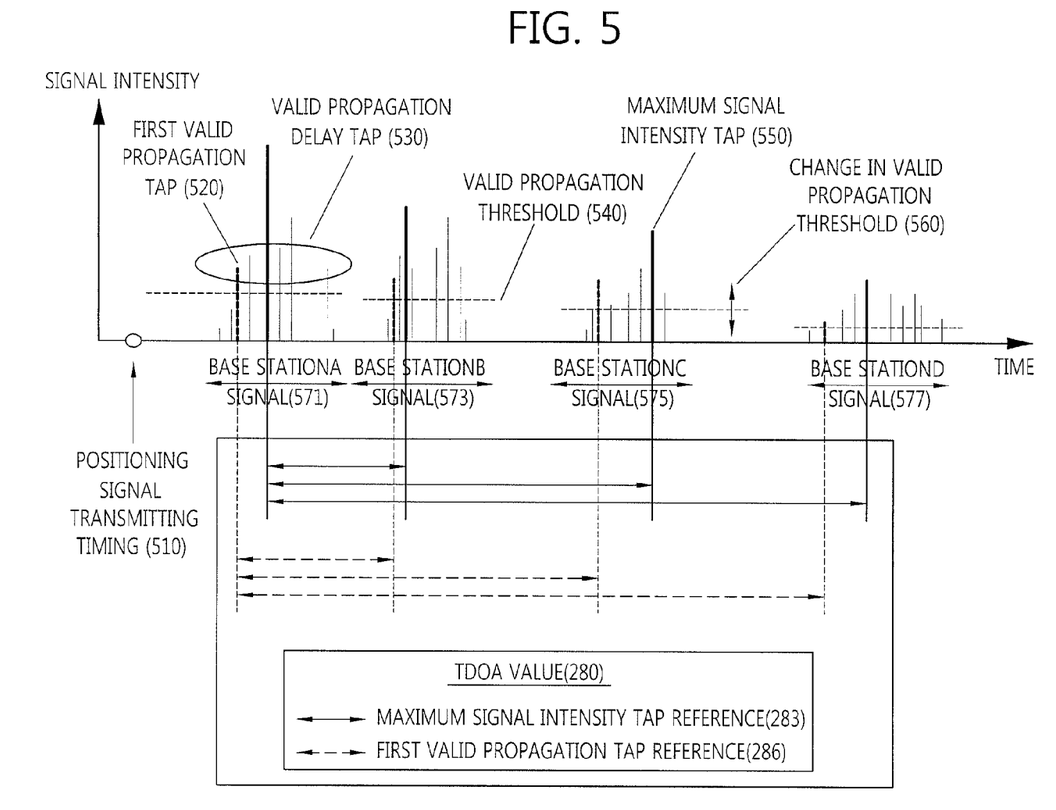
FIG. 5 is a conceptual diagram schematically showing an embodiment of propagation delay taps for each base station.

FIG. 5 is a conceptual diagram schematically showing an embodiment of propagation delay taps for each base station. In FIG. 5, a horizontal axis represents time and a vertical axis represents signal intensity. FIG. 5 may show a method for deriving the received time difference based on the propagation delay taps for the positioning reference signals.

Referring to FIG. 5, each base station may transmit the positioning reference signals to the receiving terminal at the same timing 510. The positioning reference signals received from the synchronized base stations may be represented by the plurality of base station signals on a time axis at the terminal side. The positioning reference signal for the single base station may be represented by the plurality of propagation delay taps due to the multi-paths of the synchronization channels. FIG. 5 shows the propagation delay taps of base station A 571, base station B 573, base station C 575, and base station D 577.

A propagating tap having a signal intensity of a valid propagation threshold 540 or less among the plurality of propagation delay taps may be considered as noise. Hereinafter, the propagation tap having the signal intensity of the valid propagation threshold 540 or more is referred to as the valid propagation delay tap 530. Among the valid propagation delay taps 530 for the single base station, the first propagation delay tap is referred to as the first valid propagation tap 520. In addition, among the valid propagation delay taps 530 for the single base station, the propagation delay tap having the maximum signal intensity is referred to as a maximum signal intensity tap 550.

Here, the valid propagation threshold 540 may be differently set for each base station and may be dynamically changed and operated according to the propagation environment and time within the single base station. A change 560 of the valid propagation threshold may be represented as shown in FIG. 5.

The receiving terminal may determine the final propagation delay taps for each base station among the plurality of valid propagation delay taps. In this case, the receiving terminal may determine the first valid propagation tap or the maximum signal intensity tap as the final propagation delay taps. In addition, the receiving terminal may determine one of the propagation delay taps between the first valid propagation tap and the maximum signal intensity tap as the final propagation delay taps for each base station. When the final propagation delay taps for each base station are determined, the terminals may use the determined final propagation delay taps to derive the received time difference and/or the TDOA value 280. FIG. 5 shows a TDOA value of a maximum signal intensity tap reference 283 and a TDOA value of a first valid propagation tap reference 286.

As described above, the terminals may use the maximum signal intensity tap to calculate the received time difference and/or the TDOA value. In this case, when the time distance between the first valid propagation tap and the maximum signal intensity tap is large, a large error may occur. Meanwhile, the terminals may also use the first valid propagation tap to calculate the received time difference and/or the TDOA value. In this case, when the valid propagation threshold is wrongly set, the propagation taps corresponding to noise may be determined as the valid propagation delay taps, which results in causing errors. Therefore, the terminals are determined the close propagation delay taps from the first valid propagation tap as the final propagation delay taps and needs to determine the propagation delay taps having the high valid reliability as the final propagation delay taps.

Figure 6:
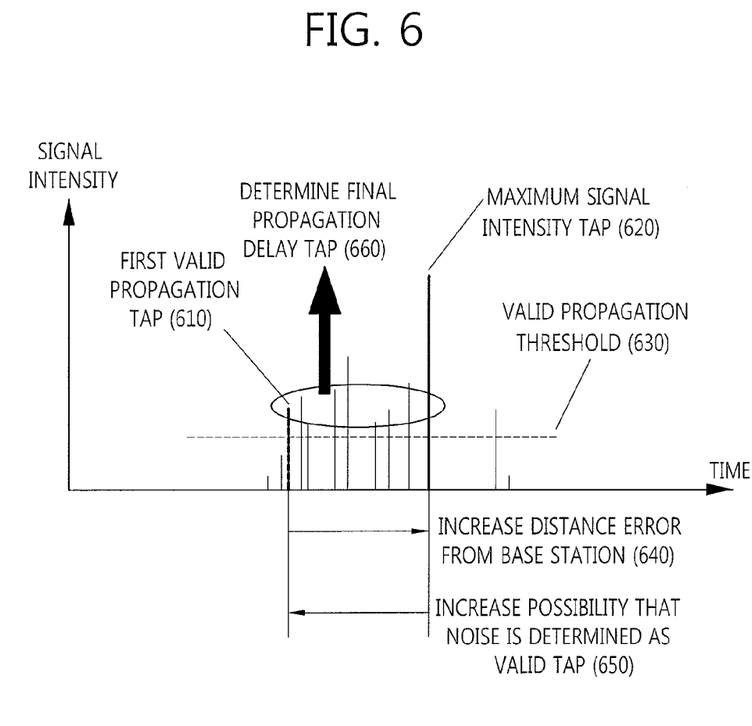
FIG. 6 is a conceptual diagram schematically showing an embodiment of a method for determining a final propagation delay tap.

FIG. 6 is a conceptual diagram schematically showing an embodiment of a method for determining a final propagation delay tap. FIG. 6 shows the plurality of propagation delay taps for a single base station. In FIG. 6, a horizontal axis represents time and a vertical axis represents signal intensity.

When the propagation delay tap close to a maximum signal intensity tap 620 is determined as a final propagation delay tap 660, an error of a distance between the terminal and the base station may be large 640 and a large error of the TDOA value may occur. In addition, when the propagation delay tap close to the first valid propagation tap 610 is determined as the final propagation delay tap 660, it is highly likely 650 to determine the noise as the valid propagation delay tap according to the setting of the valid propagation threshold 630.

As a result, it is highly likely to determine the base station having a small time interval between the first valid propagation tap 610 and the maximum signal intensity tap 620 as the base station having the high reliability. Therefore, when there are the plurality of base stations, the terminals may select the base stations used to derive the TDOA value based on the time interval between the first valid propagation tap 610 and the maximum signal intensity tap 620. That is, the terminals may selectively operate the base stations required to measure the TDOA value based on the time interval between the first valid propagation tap 610 and the maximum signal intensity tap 620. For example, when there are six base stations, the terminals may select three base stations with a small time interval between the first valid propagation tap 610 and the maximum signal intensity tap 620 and use the three base stations to derive the TDOA value. That is, the base station with a small time interval between the first valid propagation tap 610 and the maximum signal intensity tap 620 may be primarily reflected to derive the TDOA value.

As described above in FIG. 5, the receiving terminal may determine the first valid propagation tap or the maximum signal intensity tap for each base station as the final propagation delay tap. In addition, the receiving terminal may determine one of the propagation delay taps between the first valid propagation tap and the maximum signal intensity tap as the final propagation delay taps for each base station.

As the exemplary embodiment of the present invention, the terminals apply weights to the first valid propagation tap 610 and the maximum signal intensity tap 620, thereby determining the final propagation delay taps. For example, the terminals may apply the weights at the receiving timing of the first valid propagation tap 610 and the receiving timing of the maximum signal intensity tap 620 to obtain one timing and may determine the propagation delay taps at the obtained timing as the final propagation delay tap. This may be represented by the following Equation 1.

The receiving timing of the final propagation delay
taps=(1−alpha)*$T\_f$+alpha*$T\_m$    [Equation 1]

(0<=alpha<=1)

Here, the alpha may represent weights between 0 and 1, the $T\_f$ may represent the receiving timing of the first valid propagation tap 610, and the $T\_m$ may represent the receiving timing of the maximum signal intensity tap 620.

As another exemplary embodiment, the terminals may also use the received signal intensity of each propagation delay tap and/or the time delay values of each propagation delay tap to determine the final propagation delay tap.

The method for determining the final propagation delay tap is not limited to the foregoing exemplary embodiment and may be determined by various methods according to the implementation and/or if necessary. That is, as the method for determining the final propagation delay tap, all the general methods for determining one of the propagation delay tap between the first valid propagation tap 610 and the maximum signal intensity tap 620, the first valid propagation tap 610, and the maximum signal intensity tap 620 as the final propagation delay tap may be provided.

Figure 7:
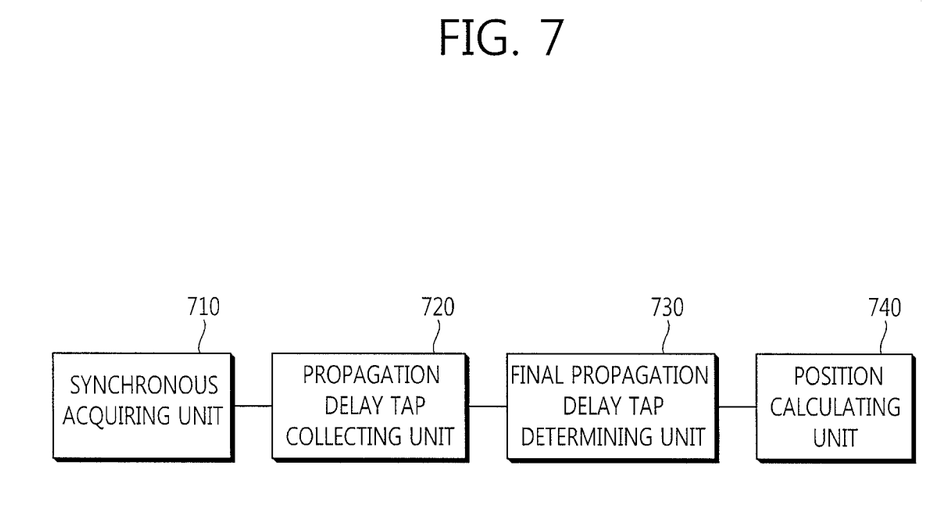
FIG. 7 is a block diagram schematically showing a wireless positioning apparatus according to an exemplary embodiment of the present invention.

FIG. 7 is a block diagram schematically showing a wireless positioning apparatus according to an exemplary embodiment of the present invention. The wireless positioning apparatus of FIG. 7 is configured to include a synchronous acquiring unit 710, a propagation delay tap collecting unit 720, a final propagation delay tap determining unit 730, and a location calculating unit 740.

Referring to FIG. 7, the synchronous acquiring unit 710 may determine whether the current communication environment is the MBS macro diversity mode. When the current communication environment is not the MBS macro-diversity mode, the synchronous acquiring unit 710 may perform the synchronization with the positioning target base stations to acquire the synchronization with each base station. When the current communication environment is the MBS macro-diversity mode, the synchronous acquiring unit 710 may determine whether to acquire the synchronization with the MBS base stations. When the synchronization is not acquired, the synchronous acquiring unit 710 may perform the synchronization with the positioning target base stations, that is, the MBS base stations to acquire the synchronization with each base station.

The propagation delay tap collecting unit 720 may measure the propagation delay taps to collect or acquire the propagation delay taps for each base station. The final propagation delay tap determining unit 730 may determine the final propagation delay taps for each base station from the acquired propagation delay tap. The embodiment of the method for determining the final propagation delay tap is described in advance and therefore, will be omitted. The location calculating unit 740 may use the determined final propagation delay tap to calculate the TDOA value. When the TDOA value is calculated, the location calculating unit 740 may use the calculated TDOA value to finally derive the locations of the terminals.

According to the foregoing method and apparatus for wireless positioning, the problem of the NLOS that is the largest error source of the positioning error can be solved and the problem of the hearability may be solved. In addition, the foregoing method and apparatus for wireless positioning may provide the generality including all of the existing positioning methods. In particular, a new MBS based positioning method using the synchronized MBS macro-diversity environment may be provided. In the MBS based positioning scheme, the synchronous acquiring problem of the existing single positioning scheme using the MBS characteristics can be solved. In addition, the wireless positioning method using the MBS environment can perform the space seamless positioning of the terminal. As a result, it is possible to largely improve the performance and accuracy based on the mobile communication based positioning.

According to the wireless positioning method according to the exemplary embodiments of the present invention, it is possible to improve the positioning accuracy.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A method for wireless positioning measuring locations of terminals, comprising:
    acquiring synchronization with base stations;
    collecting a plurality of propagation delay taps for the base stations;
    setting a valid propagation threshold value;
    determining a final propagation delay tap among the plurality of propagation delay taps;
    calculating a time difference of arrival (TDOA) value using the final propagation delay tap; and
    deriving locations of the terminals using the calculated TDOA value,
    wherein the plurality of propagation delay taps include a first valid propagation tap, a maximum signal intensity tap, and an intermediate valid propagation tap,
    the first valid propagation tap is a first received propagation delay tap among the valid propagation delay taps having signal intensity of the set valid propagation threshold value or more, the maximum signal intensity tap is a propagation delay tap having maximum signal intensity among the valid propagation delay taps, and the intermediate valid propagation taps is a propagation delay tap received between receiving timing of the first valid propagation tap and receiving timing of the maximum signal intensity tap, among the valid propagation delay taps.

2. The method of claim 1, wherein when current communication environment is a multicast and broadcast service (MBS) macro-diversity mode, the base station is an MBS base station, and the acquiring of the synchronization includes:

determining whether to acquire synchronization with the base stations; and if it is determined that the synchronization with the base stations is not acquired, performing synchronization with the base stations.

3. The method of claim 1, wherein when current communication environment is not a multicast and broadcast service (MBS) macro-diversity mode, the acquiring of the synchronization includes:

performing synchronization with the base stations.

4. The method of claim 1, wherein in the determining of the final propagation delay tap, the first valid propagation tap is determined as the final propagation delay tap.

5. The method of claim 1, wherein in the determining of the final propagation delay tap, the maximum signal intensity tap is determined as the final propagation delay tap.

6. The method of claim 1, wherein in the determining of the final propagation delay tap, the final propagation delay tap is determined using the signal intensity of the plurality of propagation delay taps, respectively, and the time delay value of the plurality of propagation delay taps, respectively.

7. The method of claim 1 further comprising setting a different valid propagation threshold value for each respective base station.

8. The method of claim 7 further comprising changing the valid propagation threshold value of at least one base station of the respective base stations.

9. A method for wireless positioning measuring locations of terminals, comprising:

acquiring synchronization with base stations;

collecting a plurality of propagation delay taps for the base stations;

determining a final propagation delay tap among the plurality of propagation delay taps;

calculating a time difference of arrival (TDOA) value using the final propagation delay tap; and deriving locations of the terminals using the calculated TDOA value, wherein the plurality of propagation delay taps include a first valid propagation tap, a maximum signal intensity tap, and an intermediate valid propagation tap, the first valid propagation tap is a first received propagation delay tap among the valid propagation delay taps having signal intensity of valid propagation threshold or more, the maximum signal intensity tap is a propagation delay tap having maximum signal intensity among the valid propagation delay taps, and the intermediate valid propagation tap is a propagation delay tap received between receiving timing of the first valid propagation tap and receiving timing of the maximum signal intensity tap, among the valid propagation delay taps, wherein the valid propagation threshold is changed according to at least one of the current propagation environment and time.

10. The method of claim 9, wherein in the determining of the final propagation delay tap, the intermediate valid propagation tap is determined as the final propagation delay tap.

11. The method of claim 9, wherein the determining of the final propagation delay tap includes:

determining receiving timing of the final propagation delay tap by applying weights at the receiving timing of the first valid propagation tap and at the receiving timing of the maximum signal intensity tap; and determining the final propagation delay tap based on the determined receiving timing.

12. The method of claim 11, wherein receiving timing k of the final propagation delay tap is determined by the following Equation, $$k=(1-\text{alpha})*T\_f+\text{alpha}*T\_m$$

where the alpha has values between 0 and 1 as the weights, the $T\_f$ represents the receiving timing of the first valid propagation tap, and the $T\_m$ represents the receiving timing of the maximum signal intensity tap.

13. An apparatus for wireless positioning measuring locations of terminals, comprising:

a synchronous acquiring unit acquiring synchronization with base stations;

a propagation delay tap collecting unit setting a valid propagation threshold value and collecting a plurality of propagation delay taps for the base stations;

a final propagation delay tap determining unit determining a final propagation delay tap among the plurality of propagation delay taps; and a position calculating unit calculating a time difference of arrival (TDOA) value using the final propagation delay tap and deriving locations of the terminals using the calculated TDOA value, wherein the plurality of propagation delay taps include a first valid propagation tap, a maximum signal intensity tap, and an intermediate valid propagation tap, the first valid propagation tap is a first received propagation delay tap among the valid propagation delay taps having signal intensity of the set valid propagation threshold value or more, the maximum signal intensity tap is a propagation delay tap having maximum signal intensity among the valid propagation delay taps, and the intermediate valid propagation taps is a propagation delay tap received between receiving timing of the first valid propagation tap and receiving timing of the maximum signal intensity tap, among the valid propagation delay taps.

14. The apparatus of claim 13, wherein when current communication environment is a multicast and broadcast service (MBS) macro-diversity mode, the base station is an MBS base station, and the synchronous acquiring unit determines whether to acquire synchronization with the base stations and if it is determined that the synchronization with the base stations is not acquired, performs synchronization with the base stations.

15. The apparatus of claim 13, wherein the valid propagation threshold is changed according to at least one of the current propagation environment and time.

16. The apparatus of claim 13, wherein the final propagation delay tap determining unit determines the first valid propagation tap as the final propagation delay tap.

17. The apparatus of claim 13, wherein the final propagation delay tap determining unit determines the maximum signal intensity tap as the final propagation delay tap.

18. The apparatus of claim 13, wherein the final propagation delay tap determining unit determines the intermediate valid propagation tap as the final propagation delay tap.

19. The apparatus of claim 13, wherein the final propagation delay tap determining unit determines receiving timing of the final propagation delay tap by applying weights at the receiving timing of the first valid propagation tap and at the receiving timing of the maximum signal intensity tap; and determines the final propagation delay tap based on the determined receiving timing.

20. The apparatus of claim 13, wherein the final propagation delay tap determining unit determines the final propagation delay tap using the signal intensity of the plurality of propagation delay taps, respectively, and the time delay value of the plurality of propagation delay taps, respectively.

* * * * *